US008027867B2

(12) United States Patent
Blenk (10) Patent No.: US 8,027,867 B2
(45) Date of Patent: Sep. 27, 2011

(54) SYSTEM AND METHOD FOR DECISION OF PUBLISHING LITERARY WORK BASED ON REVIEWER'S SATISFACTION DEMOGRAPHIC FACTORS (76) Inventor: Christopher W. Blenk, Charlotte, NC (US)

( * ) Notice: Subject to any disclaimer, the term of this patent is extended or adjusted under 35 U.S.C. 154(b) by 0 days.

(21) Appl. No.: 12/251,070

(22) Filed: Oct. 14, 2008

(65) Prior Publication Data
US 2009/0037259 A1 Feb. 5, 2009

Related U.S. Application Data (63) Continuation of application No. 09/678,313, filed on Oct. 3, 2000, now abandoned.

(51) Int. Cl.
G06F 9/44 (2006.01)
(52) U.S. Cl. .................. 705/7.33; 705/7.29; 705/7.32
(58) Field of Classification Search ................ 705/7.29, 705/7.32, 7.33
See application file for complete search history.

(56) References Cited

U.S. PATENT DOCUMENTS

| 5,146,552 | A | 9/1992 | Cassorla et al. | |
|---|---|---|---|---|
| 5,802,518 | A | 9/1998 | Karaev et al. | |
| 5,892,900 | A | 4/1999 | Ginter et al. | |
| 5,987,302 | A | 11/1999 | Driscoll et al. | |
| 6,006,332 | A | 12/1999 | Rabne et al. | |
| 6,249,785 | B1 | 6/2001 | Paepke | |
| 6,260,064 | B1* | 7/2001 | Kurzrok | 709/224 |
| 6,385,614 | B1* | 5/2002 | Vellandi | 707/9 |
| 6,473,084 | B1* | 10/2002 | Phillips et al. | 345/440 |
| 6,513,033 | B1 | 1/2003 | Trauring | |
| 6,591,258 | B1* | 7/2003 | Stier et al. | 706/50 |
| 6,604,131 | B1* | 8/2003 | Warris et al. | 709/205 |
| 6,948,069 | B1* | 9/2005 | Teppler | 713/178 |
| 7,093,229 | B2* | 8/2006 | Pang et al. | 716/21 |
| 7,162,433 | B1* | 1/2007 | Foroutan | 705/7.42 |
| 7,433,832 | B1* | 10/2008 | Bezos et al. | 705/26.8 |
| 7,552,068 | B1* | 6/2009 | Brinkerhoff | 705/7.32 |
| 7,664,669 | B1* | 2/2010 | Adams et al. | 705/7.32 |
| 7,801,738 | B2* | 9/2010 | Agarwal et al. | 705/1.1 |
| 2001/0032156 | A1* | 10/2001 | Candura et al. | 705/36 |

(Continued)

OTHER PUBLICATIONS

"Development and Validation of a Multimedia user Interface Usability evaluation tool in the Context of Educational Web Sites", by Al Nuaim and Hana Abdullah, The George Washington University, 2000.*

(Continued)

Primary Examiner — Scott L Jarrett
Assistant Examiner — Pan Choy
(74) Attorney, Agent, or Firm — Hunton & Williams LLP (57) ABSTRACT A system, method, and business model by which literary works are posted for review on publicly accessible networks such as the internet where reader input is used to identify the works likely to succeed in the marketplace, Authors/writers submit works for electronic review. Reader demographics (where possible) and reader evaluations of works are recorded and used to rank submitted works. Top ranked works receive additional reviews until a "market significant" level is reached. All authors are provided feedback and ranking statistics on their works. Top ranked authors are allowed to market their works using the branding of the business or publicly accessible network (e.g., internet site branding). Publishers, agents, and other media representatives are provided access to top ranked authors/writers, their works, work-specific statistics and overall market statistics. This invention may be characterized as a reader-based, electronic, editorial marketplace for literary works, providing services across the publishing industry and other media industries.

39 Claims, 2 Drawing Sheets

U.S. PATENT DOCUMENTS

2002/0024534 A1 2/2002 Tenembaum
2002/0049792 A1 4/2002 Wilcox et al.
2004/0010557 A1* 1/2004 Chapman et al. ............ 709/206

OTHER PUBLICATIONS

"Publish with Perishing: A Practical Handbook for Academic Authors", by Peter Benjaminson, NEA Professional Library, P.O. Box 509, West Haven, CT 06516, 1992.*

"The ICSU Press Programme on Electronic Publishing in Science", By D.F. Shaw, Keble College, Parks Road, Oxford, OX1 3PG, UK, Astrophysics and Space Science 247: 95-116, 1997.*

"Publishing and Book Trade in Kenya", by Ruth Makotsi and Lily Nyariki, Published by East African Educational Publishers Ltd., 1997.*

Peer review 'Still essential', by Declan Butler, Nature—vol. 379, Feb. 29, 1996.*

Unknown, Archived Version of Epinions Online Shopping Guide Preview; Retrieved from the Internet at: http://web.archive.org/web/19991204120227/http://www.epinions.com/ on Dec. 4, 2003.

* cited by examiner

SYSTEM AND METHOD FOR DECISION OF PUBLISHING LITERARY WORK BASED ON REVIEWER'S SATISFACTION DEMOGRAPHIC FACTORS

CROSS REFERENCE OF RELATED APPLICATIONS

This application is a continuation of U.S. patent application Ser. No. 09/678,313, filed on Oct. 3, 2000.

FIELD OF THE INVENTION

This invention relates to identification of talented unknown authors/writers and their works in the publishing and entertainment industries and the process by which publishers, agents, and other media representatives identify authors/writers and works with high potential for market success in the traditional, self, vanity, and electronic publishing markets.

BACKGROUND OF THE INVENTION

For centuries, publishers have struggled to identify authors/writers and literary works which were of high enough quality or desirability to be accepted widely in the marketplace. The profitability of traditional publishers is largely due to established books with consistent yearly demand, "the backlist" (e.g., the bible).

Publishers and agents do attempt to publish works that are not already widely read. This category of books is known as the "frontlist." A great deal of manual effort and expense goes into identifying, editing, and marketing these frontlist works and the success of individual works is highly variable. This success rate is so variable that publishers often lose money on marketing and manufacturing of frontlist books that do not sell at the forecasted levels. A very low percentage of works submitted by unknown authors to publishers and agents are actually deemed worthy of publication and the process for identifying these works is entirely manual and of further unrecoverable cost to publishers and agents. In fact, the work is often rejected by the publishers and agents based only on a letter describing the work which may not be appropriately representative of the work.

An established practice for unknown authors is to submit the same work to multiple publishers and agents in spite of rejections. Repeated rejections are a further inefficiency as authors/writers must spend years and significant effort resubmitting the same work to several publishers and agents who must at least spend expend enough effort to reject the work. In addition, rejections do not often provide constructive criticism to aid authors/writers in improving their works, continuing the likelihood of wasted effort in further attempts to resubmit for publication.

To minimize losses, publishers regularly market and print frontlist books by established authors with widely recognized names as they are more likely to be purchased by readers (e.g., Stephen King). This understandable preference makes it even more difficult for unknown author/writers to achieve publication.

In addition, authors and works who are later successful are often ones which were rejected repeatedly by publishers and agents. As a result of these inefficiencies, several alternative industries have been created. These industries include vanity publishing and self-publishing houses who receive payment from authors to publish the authors work. More recent alternatives include (1) on-demand publishers who store an electronic copy of the work and print upon demand; (2) electronic publishing on public networks where the edited or unedited works are posted for electronic purchase at discounted prices; and (3) organizations which contract with publishing houses to electronically publish unsolicited submissions which have not been reviewed by the publishers.

Marketing is another area of uncertainty, inefficiency and risk for publishers and authors who chose alternative publishing. As the success of an individual work is forecast based on opinion, so is the marketing effort and capital. Incorrect opinions have resulted in wasted capital and effort and are evidenced by the creation of discounted book warehouses where unsuccessful, overproduced books are sold at a loss in the attempt to recover some fraction of the cost of production and marketing.

Publishers often ask focus groups of readers to provide manual feedback on the likelihood of success of a particular work after it has been selected as a candidate for publication. This method of soliciting and accepting feedback varies between publishers and is limited in efficiency because it is largely manual process and used only for selected works prior to publication, and limited in the number of readers who provide feedback on a particular work.

In attempts to market books, authors and publishers have posted sections of books on internet sites allowing readers the option of reading portions of the work prior to purchasing either electronic or paper formats. In one case, a publisher recently posted sections of a widely accepted author's unpublished book on the internet and successfully invited criticism by readers in order to improve the book and to act as a marketing tool prior to publication. These postings were for published or widely accepted authors, however, and did not address the inefficiencies associated with the current, manual, inefficient, slow, expensive, and error prone processes for unknown author publication.

It can, therefore, be appreciated that there are many problems associated with the process of identifying and marketing authors/writers and works which are likely to be widely accepted in the marketplace. It can be further appreciated that these processes are disliked by all parties involved including authors/writers, agents and publishers.

Other drawbacks and problems also exist with current systems.

SUMMARY OF THE INVENTION

The present invention overcomes the demonstrated inefficiencies associated with identifying authors/writers and works which are likely to be widely accepted in the marketplace by providing a unique, electronic process by which partial works are submitted for review by readers, reader feedback is captured and focused more on submitted partial works having a high potential for success, and quantifying the results for use by authors/writers, agents, publishers, and the readers themselves. As readers compose the marketplace, their acceptance and feedback are indicators of potential for success of an author/writer or work. This automated, targeted, quantifiable accumulation and analysis of reader/market feedback prior to publication of a work and based on a section of the work provides a number of advantages.

One advantage of the present invention is to provide a forum for rejection/approval of works which obtains direct market feedback, thereby minimizing the number and need of resubmissions. The direct market (multi-reader) feedback may be based upon a partial work rather than on the entire work to maximize the efficiency of the rejection/approval process.

Another advantage of the present invention is to provide a source of feedback for the author/writer directly from the marketplace ideally containing demographics of readers which may be used to improve the work for later resubmission or improve the author's/writer's style of writing.

Another advantage of the present invention is to provide a method/algorithm by which, after a minimum number of on-line reviews by readers, works judged to have a higher likelihood for success are provided with additional reviews to improve the accuracy of market acceptability predictions and to keep the level of reader satisfaction high.

Another advantage of the present invention is to provide individualized, statistical analysis to the author/writer of feedback from the marketplace on the percentage likelihood of success of the work based upon the submitted partial work. These statistics may be used to suggest traditional publication versus other forms of publication or alteration of the work prior to resubmission and suggest/confirm a likelihood of success among unexpected/suspected demographic groups.

Another advantage of the present invention is to provide statistical analyses to agents/publishers on works to aid these entities in the selection of works for publication.

Another advantage of the present invention is to provide branded and non-branded tools for use by authors/writers and/or agents/publishers in marketing works having received a high predictability of success in the marketplace thereby effectively marking a work as a likely best seller upon introduction to the market. This offering is expected to provide the work with immediate credibility.

Another advantage of the present invention is to provide a business model under which this process and method minimize the financial impact on unknown authors/writers by accepting a minimal submission fee and limited future rights to merchandise and entertainment media revenues related to the work and/or partial work submitted even if the partial work is eliminated from the eventually published work. The fee should be sufficient to discourage some number of prank/plagiaristic submissions.

A further feature of this model is to provide access to agents and publishers of the appropriate type (e.g., traditional, on-demand, etc.) for authors/writers submitting partial works which receive a high predictability of success in the marketplace.

In carrying out one form of the present invention, one of many authors/writers creates a literary work in any format they wish. The author/writer is encouraged to follow several steps to optimize the quality of the work. Prior to submitting a portion of the work, the author/writer is encouraged to obtain an account in which demographic information on the author/writer is stored. At any time thereafter, the author/writer submits the work to a sewer system, such s by copying a section of the work into a field within a provided interface (e.g., HTML form within a browser) and is allowed to review and format the work prior to submission. As part of the submission, the author/writer answers questions relevant to the work including but not limited to targeted readers (e.g., juvenile) and classification (e.g., science fiction). Upon submission, the submitter may provide a transaction fee and agree to a contract with the receiving entity (e.g., corporation or other entity providing this service) in which a small percentage of revenues resulting from later use/modification are due to the receiving entity. The receiving entity stores the submission in a manner which designates it as not having been reviewed and which ties the work to the author/writer.

A processing engine and an algorithm are utilized by the receiving entity to present the work to readers; track reader responses; and halt the reviewing process for that work after a minimal number of reviews are received unless it obtains a high rating by reviewers. Ratings can be judged by a number of methods and at varying complexity levels. If the work is highly rated by readers, the work may continue to be read by readers until receiving a statistically significant number of reviews that represented the appropriate demographics for the target market. By this method, all works are read by multiple individuals and the quality of the material is kept higher on average.

Authors/writers may view the rating statistics and individualized reader feedback either during or after the review process completion. Authors/writers receiving less than desirable ratings on works can make adjustments based on reader feedback if necessary/appropriate and resubmit if they desire for an additional fee.

Authors/writers receiving significantly high ratings can publish their work either via the receiving entity or independently, and can include or eliminate the rated portion of the work, but are bound to provide the receiving entity with the contractually obligated revenues.

The receiving entity may license its branding to works receiving the appropriate rating levels thereby lending credibility to the works prior to their entering the marketplace. For example, the work can be published with an "On-line Review Selected" or some other certification.

The receiving entity may choose to offer auctions or other sales models to enable authors/writers to optimize their monetary income from the work. The receiving entity may choose to market the ability to review works and statistical data products to publishers/agents or provide special access for publishers/agents to bid on or contract with authors/writers of highly rated works.

The receiving entity may also provide access to the appropriate parties (e.g., vanity publishers) for the mediocre authors which may choose to utilize their rating data to target market the readers or demographics that rated the work positively. The receiving entity may choose to market the ability to review works and statistical data products to the appropriate parties (e.g., vanity publishers) or provide special access for these parties to bid on or contract with authors/writers of mediocre rated works.

DETAILED DESCRIPTION OF VARIOUS EMBODIMENTS OF THE PRESENT INVENTION

Figure 2:
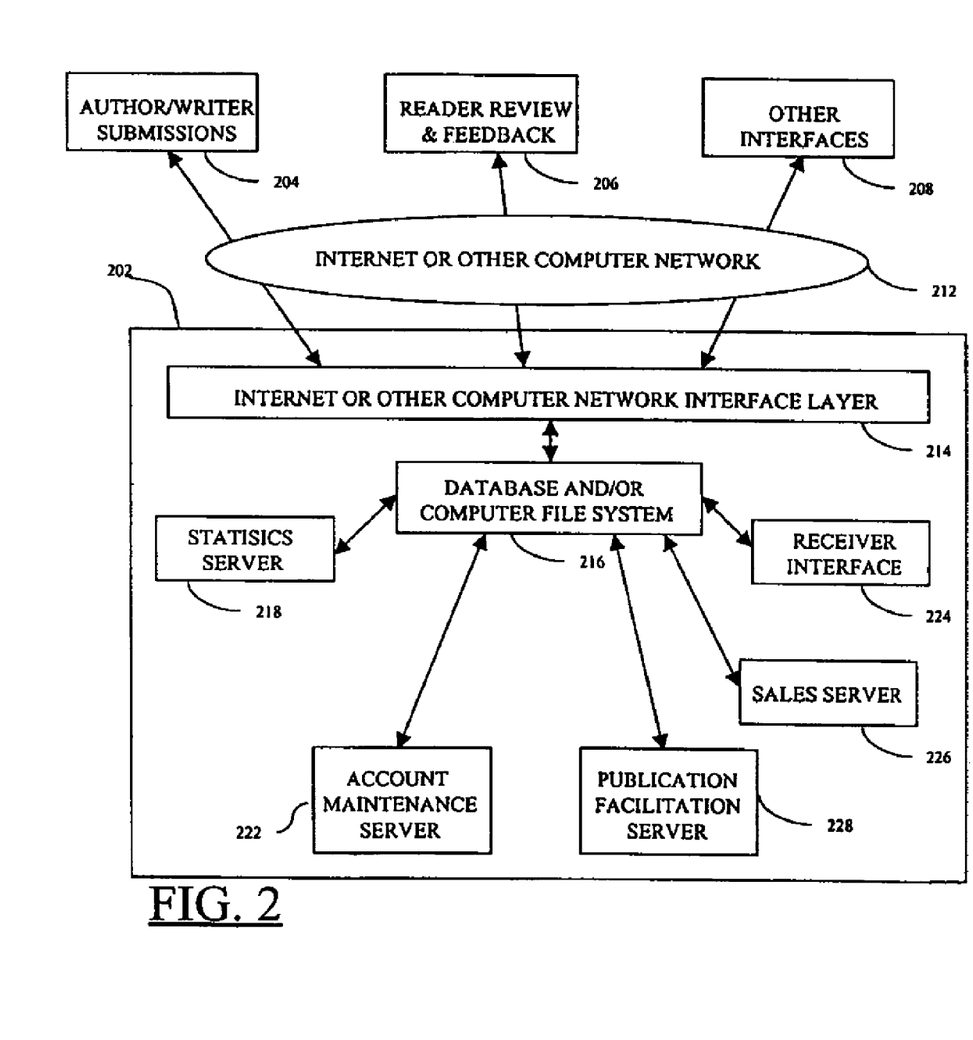
FIG. 2 is a block diagram showing a system utilizing the invention and the system interfaces according to an embodiment of the present invention.

According to an embodiment of the present invention, as depicted in FIG. 2, for example, a forum and system 202 is created for the review of unpublished or minimally published literary works to receive reviews from members of the reading public. The reviews of works are statistically or otherwise analyzed by a statistics server 218 for the purpose of evaluating the potential for success of the work and the potential for success of the authors/writers in the marketplace. Beyond analyzing the potential for success, the system facilitates the process of bringing the works to the marketplace and in communicating to the targeted audience the level of success expected for the work based on the reviews mentioned above in the form of marketing materials.

While the internet is ideal for this invention, use of the invention by other networks or computer systems is quite feasible including but not limited to wireless, or private networks.

Although the system 202 is designed for multiple authors/writers and/or multiple works, for simplicity of description, it may at points be described in the singular and as the invention relates to the book publishing industry, i.e., the detailed description provides a specific embodiment for how a single work is processed with the intent of being published in book format. In addition, partial works may sometimes be referred to as the "submitted work" or "the work" when described in the context of being reviewed.

Initially, a receiving entity, also referred to as "the receiver," provides system 202 for use by authors and creators or works to send in works to be reviewed and published. System 202 receives a work and guides an author/submitter through the review process shown in FIG. 1, statistical analysis, and communication of results to targeted audiences which may include but is not limited to authors/writers, publishing houses, literary agents, readers, the book purchasing public, electronic publishers, editors and/or the receiving entity itself.

An author/writer creates a work or section of work to be reviewed. Ideally, a pool of authors/writers submit large quantities of partial works for review. The larger the pool, the higher the likelihood of the invention being used to identify authors/writers and works with a high probability of success in the marketplace.

In one embodiment, system 202 provides an account maintenance server 222 through which author/writers create an account with the receiving entity or otherwise indicates their identity in such a manner as to allow verification of the identity of the author/writer for reporting of the review results and to create a contractual relationship. The author/writer is then provided guidance regarding various actions that may be taken prior to submission of their work to improve the likelihood of success of the work. For example, authors/writers may be encouraged to submit a section of their work which is most likely to excite the interest of readers and in a format most conducive to the review process (e.g., spell-checked, properly formatted as it will be displayed, etc.). Authors/writers may also be instructed to categorize the work by industry categorizations standards (e.g., science fiction, fantasy, juvenile, etc.) upon submission to enable targeted reviews by readers wishing to read the corresponding category of works.

FIG. 2 describes the receiving entity's systems 202 and interfaces. Electronic submission of works may be enabled by different technologies and processes, however, various illustrative embodiments are provided herein for illustrative purposes. Authors/writers supply the appropriate identification criteria to the receiver for security, payment, tracking or other purposes, then prepare the selected section for submission. The receiver interface server 224 may provide a graphical user interface through which an author/writer may submit information and a work for review. For example, receiver interface server 224 may comprise an HTML based form system for the writer to electronically paste a copied section of their work into. FTP, email and other file transfer protocols may also be used to enable an author to submit a specifically identified work for review. Through receiver interface server 224, the work is received and stored electronically in a database and/or file system 216. It should be appreciated that database/file system 216 may comprise any of a plurality of different formats, styles and types.

For each work created and stored for an author/writer, receiver interface server 224 presents the work to a plurality of different reader reviewers through feedback (as depicted in element 206). These readers may access the server over the Internet or other computer network 212. According to one embodiment of the present invention, receiver interface server 224 provides works for reading and review in an arbitrary or unpredictable manner to avoid organized efforts by a group of readers in biasing the results of the reviews for personal reasons. To assist in maintaining an unbiased review process, to enable appropriate tracking and compensating of reviewers, and to provide demographic data for marketing purposes, receiver system 224 creates incentives for readers to also establish an account. When the reader creates an account, the receiver system 224 may compare information to prevent readers from reviewing their own work. For example, system 224 may offer money, coupons, group membership benefits, or any other financial incentive. Additionally, system 224 may create recognition incentives, such that reviewers may be acknowledged in the published work if the work is eventually published through the present system. Other incentives may also be provided to encourage readers to register and create an account with system 224.

Even without an incentive, many readers simply enjoy the opportunity to read works that do not cost any money. Further, many readers enjoy providing feedback and feeling part of an overall process. Therefore, the system may be employed without use of any incentive other than personal satisfaction on the part of the readers.

In any event, a plurality of readers may review works stored on the system. In one embodiment, readers may be enabled to select a category and then the system randomly presents a work for review from the many stored in the database listed in that category. For example, a reader may select a science fiction book and then the database may select one of several hundred works to be reviewed in the science fiction category and present that book. To track which readers have reviewed which books, the database entry for the reader may be updated with a listing of the identification number of the work being presented for review. Other methods of tracking this information may also be used and stored in database systems.

The review process may take many forms, but preferably involves on-line review of an electronically transmitted version of the work. Reviews of works might be achieved through various mechanisms, one of which is a reader viewing works via a website. The system 224 may provide a web server to enable any browser system to access a work in electronic format for presentation to a reader. Feedback may then be presented back from the reader through another interface presented by the server 224 through element 206.

An algorithm for storing works and reviews of works is as follows: When the work is submitted and stored, a number, the 'reviewcounter,' is set to an initial value indicating that it has not yet received any reviews. Each time the work is presented to a reader, another number, the 'viewcounter' is incremented by one. Each time a reader submits a review for the work, the reviewcounter is incremented by one. These counters are readily available in commercial databases & file systems 216.

After a minimal, yet significant number of reviews (e.g., 10 reviews, although other numbers may be selected) (the number of reviews being indicated by the reviewcounter), this work may be withdrawn from availability for review unless it has a significantly high percentage of positive reviews (e.g., works receiving less than 60% positive reviews would not be presented to readers again). Works receiving a significantly high percentage of positive reviews, and thereby be more likely to be well-accepted in the marketplace, may be put through a secondary review wave involving another predetermined number of reviews (e.g., 5 more reviews). Then, if desired, only works receiving yet higher level of positive reviews may be passed on to subsequent rounds of review. This process of elimination may be repeated at ever increasing percentage cutoff points if desired, however a single, well-chosen, cutoff may be used to keep the average quality of the materials being presented to readers high while providing a sufficient number of reviews to each submitted work.

Figure 1:
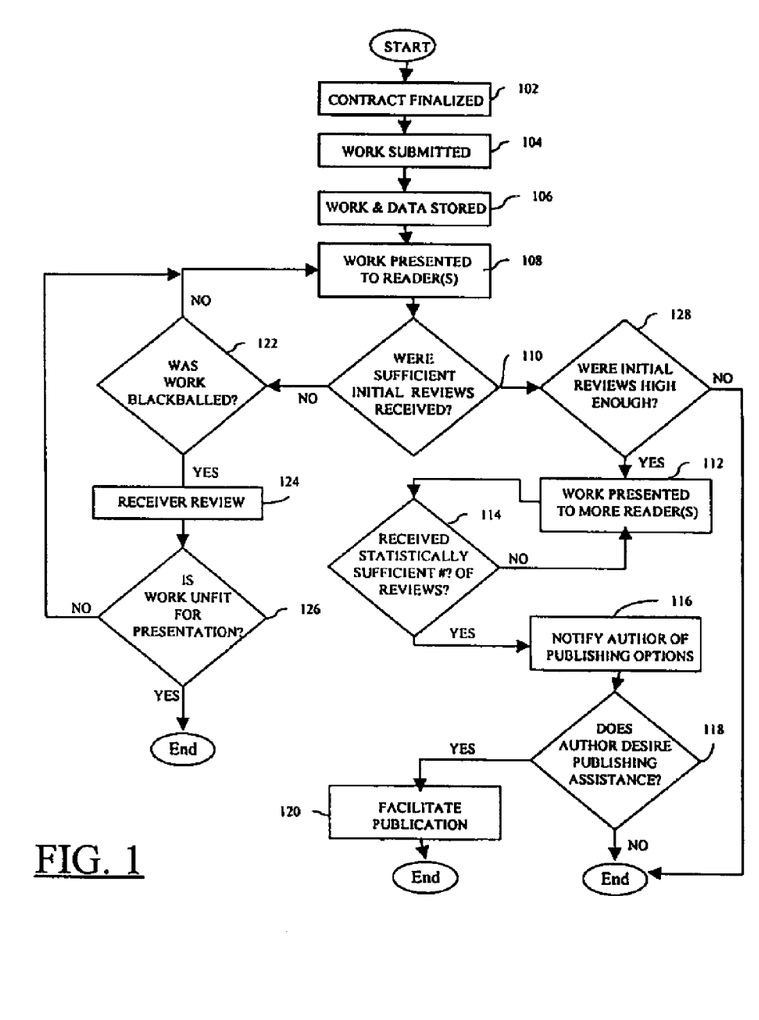
FIG. 1 depicts a process for a submitted work through the review process and potentially through the publishing process according to an embodiment of the present invention.

For those works receiving additional reviews, the option exists to discontinue reviews after a market significant reviewcounter value is reached 114 (e.g., 25 reviews). After some minimum number of reviews, a statistically significant sample of the population of a given country/demography may have been provided an opportunity to review the work such that additional reviews from that country/demography will be insignificant. By eliminating further additional reviews in such cases, the process further optimizes the efficiency of identifying authors/writers and works with a high potential for success in the marketplace.

According to another embodiment of the present invention, selection of works for a reader to review may not be completely random. Rather, a particular work may have a set list of backgrounds for readers from whom to review the work. Therefore, the work chosen for a reader to review may be selected based on the reader's background and the list of backgrounds yet to have reviewed the work.

For example, the system may specify that for science fiction works, prior to level one evaluation (e.g., after 10 reviews), the work should have been reviewed by at least one man and at least one woman, at least one person from the east-coast and at least one person from the west-coast. Therefore, the system may select the work for a reader based on the persons background. Other algorithms and techniques may be used to include persons of specified demographic backgrounds in the review for works prior to evaluating a work. As another example, for a southern writer, a significant number of southern readers may be required prior to evaluation because demographically those readers may be more likely to like such a book. That helps to more closely tailor the review process to the demographics of the audience to whom the work would most likely be marketed. Otherwise, a southern writer's book may be rejected if all of the first level reviewers were from Alaska, but would be well-reviewed if at least half of the reviewers were from the south.

Reviews may be submitted on works in various fashions. According to one embodiment, reviews provide quantifiable and free-text format feedback from reviewers. For example, the quantifiable feedback might take the form of multiple choice questions presented to reviewers in the form of HTML radio buttons within a form to be posted to the receiver over the internet. The choices indicated in the posted form may be processed by the receiving interface server 224 used to increment counters by values weighted in accordance with the reviewer's choice. Questions presented to reviewer's might be simple (e.g., related to the willingness to purchase the overall work) or more detailed and probing of the characteristics of the work (e.g., related to the characters, plot, ease of understanding, etc.).

The quantifiable feedback provided by reviewers lends itself to statistical rating of works. For example, the percentage of reviewers rating the work as one they would be willing to purchase indicates market popularity of the work. To further elaborate on this example and assuming statistically significant sample populations, a work which 100% of reviewers rated as being one they were "anxious to buy" would have a higher probability of market success than a work which less than 1% of reviewers would expect to purchase. In addition to providing statistics on individual works, books could be rated against other submitted works. For example, the author/writer of a particular work would be informed that their work was ranked in the top 5% of all submissions within a given period. To achieve all of these calculations, a statistics server 218 may be provided.

Free-text content within reviews is useful to all parties by providing direct, unfiltered feedback directly to authors/writers and those entities purchasing rights to the works. The advantage of this feedback is that both constructive criticism, encouragement, and marketing content is directly collected and provided to the appropriate parties. User interfaces 208 for purposes other than submitting and/or reviewing works may be employed in order to display statistics, provide reader feedback to authors, facilitate publication, and satisfy other needs.

The receiving entity may also provide readers the ability to remove offensive, plagiaristic, or otherwise inappropriate works from the review process by enabling a "blackball" capability. This capability denotes the work as being improper. After a work received a limited number of blackball ratings, this work could be examined by hand and the receiving entity could either confirm the rejection or place the work back into the review process.

Once a sufficient number of works receive the statistically significant number of reviews, the top rated works may then be made available to publishers and agents for a facilitated purchase (e.g., auctions or closed bids made available to the author/writer). Also, authors/writers may choose any combination of options including, but not limited to, traditionally negotiated large-scale publishing, self-publishing, on-demand publishing, and e-publishing. This process may be facilitated by automated processes employed in the publication facilitation server 228.

The receiving entity may also display selected works on the site indefinitely either for exemplary or marketing reasons. (e.g., "read the rejects" and "read the best" sections).

The receiving entity may choose to track reader accuracy to provide ratings of readers who hoped to become critics or to verify review of works by a famous author/writer prior to the author/writer achieving frame. The entity may use this tracking capability as an incentive for readers by rewarding high performing and accurate reviewers. For this or other purposes, the receiving entity may choose to collect reader demographics in return for privileges and rewards. Each of these tasks and more could be performed by the account maintenance server 222.

Security of author's/writer's works is an important consideration. The time of submission for works should be recorded, or timestamped, to prevent credit for the work being given to a reader who copies the work while reading and resubmits it at a later date under a different identity than the original author/writer. The timestamp serves as an additional measurement in any dispute of ownership of a particular work. In addition, the work is expected to be a partial work and not the entire work, therefore the author/writer retains some personal control of protection of their entire work. A further security consideration may be implemented by ceasing presentation of a work for review once a sufficient number of readers has reviewed the work 114. Thus, a limited number or readers have access to the work making the likelihood of plagiarism lower. In addition, any presentation of works should display the copyright symbol. Authors/writers should be informed that all works displayed by the receiver will bear the copyright symbol and be protected by the copyright laws of the United States of America.

As these systems are electronic, technical security measures should be implemented according to the platform(s) on which the receiving entity communicates 212. For example, a receiving entity operating on the internet should provide sufficient security to minimize the possibility of hackers accessing/altering the works, review data or computer programs/databases containing or presenting these materials 214.

While this invention does not necessarily require any specific language, a receiving entity utilizing this method and model should standardize on one particular language for the benefit both readers and authors/writers. For example, an English language based internet site employing this method and business model would be able to service both English speaking and non-English speaking countries as non-English speaking countries contain English speaking residents who may act as either authors/writers, readers, agents, and/or publishers. Servicing multiple countries enables evaluation of each work's likelihood of market success based on readers' countries of residence/origin or other demographics.

As described herein, a process for identifying works for publication based on reader submitted evaluation is depicted in FIG. 1. First, in step 102, a contract is finalized between the work submitter and the entity that operates the review site. In particular, the contract might specify that a portion of the proceeds of the work, if it is published, is provided to the entity that provides the evaluation. Authors are provided an incentive to participate because if the reviews are positive, due to the success of the program, publishers and agents are more willing and more likely to select that author's work for publication. By contracting for future royalties, authors are able to participate without a high degree of initial cost. A fee may be associated with submission of each work, but the fee may be kept to a reasonable level so that the author's costs is based on eventual publication. This provides the incentive by the server entity to provide resources to the author to make it more likely that the authors work is published.

Next, in step 104, an author submits a portion of a work to be evaluated. Although according to one embodiment of the present invention, the work may be a literary work such as a chapter of a book, a portion of a poem, a series of scenes from a play, or some other portion of a literary work, it should also be appreciated that audio works, video works and any other work of art may be submitted for review as well according to the techniques described herein. In step 106, the work and information about the work is stored. The information about the work may comprise the genre in which it is to be placed, the age group to which it is directed (e.g., K-3, 4-7, adult, etc.), authorship information, time of writing for copyright purposes, an acknowledgment that the work has not been granted rights in to another entity, and other information that the publisher, readers, or server system may find valuable.

Next, in step 108, the work is presented to a number of readers for evaluation. As described above, the method of presentation of a work is varied according to the present invention, but the general purpose is to enable a number of different readers to evaluate the portion of the work to determine whether or not they would be interested in purchasing the work if it were available for sale. The review process continues until a predetermined minimum number of readers have reviewed the work and then in step 110, the system determines whether or not that predetermined number of readers has been reached for that particular work. If so, then in step 128, the system determines whether or not a sufficient satisfaction level is achieved based on the predetermined first level minimum. If not, then the work is removed from review and a notification is sent to the author that the work was rejected. At that point, suggestions may also be sent to the author on how to improve or revise the work, along with feedback directly from readers to enable the author to improve the work and allow them to resubmit it if it is more than just minorly edited. The integrity of the system is such that it should not allow the reader to resubmit the work over and over again without any significant modification if it has already been rejected. If so, readers may be disinterested in visiting the site because they may encounter the same works over and over again that they have already reviewed.

If the initial first level review is high enough, then in step 112, the work is put into a second level pool for more readers to review. It should be appreciated, as described above, that the first level review readers and the second level review readers may comprise the same or different demographics depending on the scheme employed by the system. Again, in step 114, another significantly sufficient number of reviews is obtained. As discussed above, the second level review may be fewer or the same as the first level review depending on the scheme employed. If the sufficient number of readers have not reviewed the work, the system cycles between step 112 and step 114 for this particular work until it is. When it is obtained, then in step 116, if the satisfaction level reaches a second level satisfaction rating, then the system notifies the author of publishing options. Specifically, the different publishing options may be presented. For example, if the work achieves a 95% approval rating, first tier publishers may be presented to the author, whereas if the work achieves a lower approval (e.g., 75% approval) second level publishers may be presented to the author. The publishing options presented may be based on predetermined contracts between this server entity and publishers, agents, and other interested parties in the publishing business.

For example, the server entity may contract with one of the publishing houses that specifies that the publishing house gets right of first refusal for certain approval level works in exchange for a ongoing fee or in exchange for a higher than normal commission to the server site for bringing the work to the publishing company. Other agreements between the server site and publisher such as vanity publishers, etc. may also be provided. For example, a particular vanity publisher may be given premier treatment in exchange for higher royalty rates paid to the server site. In any event, the publishing options are presented to the author and in step 118, the author is asked whether it desires assistance in achieving publication. If not, the server system backs out but notifies the author of its ongoing obligation to pay a royalty if the work is ever published. If the author does desire assistance, then in step 120, the system facilitates publication through its arrangements and other personnel options.

Going back up to step 110, in step 122, the system determines whether the work has been blackballed. Specifically, the server system may want to maintain a certain level of integrity such that works that are generally offensive are not presented by the server site. By doing so, the site is less exposed to claims of exposing children to inappropriate material. Additionally, it encourages the every-day reader that might be offended by such works to return if they are sure that the likelihood of reviewing an offensive material is reduced. Accordingly, each reader has the opportunity to put a blackball on a work reviewed. If the work has been blackballed as determined in step 122, then the receiver system provides a person to review the work in step 124 to provide independent confirmation that the work is inappropriate. This is appropriate to ensure that a reader does not blackball the work for an incorrect reason. In step 126, if the reviewer determines that the work is unfit for publication under the banners of this receiver site, then the work is removed and the author is notified of its blackball status. If not, the work is submitted back into the pool for presentation and review.

As seen from a description of the present invention, the system described herein provides the ability for authors to receive direct reader feedback on their work such that the work may achieve a certain approval status. Authors are then able to take that approval status and show publishers that it has been liked by an independent and somewhat uncontrolled readership. Particularly, if the server system is able to customize the demographics of the readers to which the work is reviewed, even a demographically specific work may be able to provide the necessary statistics to prove to publishers that it is worth their investment. As such, the server site provides a great deal of value to the authorship such that they are willing to pay a fee for submission of the work and/or granting a commission on all licensing and royalties received on the work.

Additionally, readers receive the benefit of being able to read varied works for free and provide them the opportunity to provide review and comment. Many readers enjoy feeling a part of the creation process and believe that providing insight into the work is a very rewarding endeavor. Additionally, the server system may provide other benefits to its readers, such as discounted prices when the work is actually issued or even providing a copy of the work for free. Other advantages exist for the readers.

Publishers and agents are also encouraged to participate in the system because they are provided a screening process to reduce the number of works that they have to review. Further, by providing a demographically diverse reader pool, reviews are based on real reader input and not just on the opinion of a professional evaluator at the publishing house.

Accordingly, there are a number of ways in which this particular method may be employed to the economic benefit of the server system. Methods for receiving entities to generate revenue with this invention include, but are not limited to, the following:

a fee collected when works are initially submitted, potentially using non-cash payment which could serve to further verify the identity of the submitter, in exchange for an agreement to receive and process the work;

a contract explicitly communicated to the author/writer and agreed to before or during submission of a work, such that the author/writer agrees to assign rights to a fraction of all future revenues from the work and subsidiaries both foreign and domestic including but not limited to movies for television, motion picture productions, sequels, electronic publications sales, and book sales;

licensed brand awareness achievable for a sufficiently popular receiving entity, such that the receiving site's branding in combination with the quantifiable statistics provides a marketing tool to be licensed by authors/writers or publishing entities for use in marketing and promoting works;

the sale and distribution of subsidiary products related to authored works including but not limited to early copies of manuscripts, autographs from authors, and first edition copies;

access fees charged to agents and publishers for data, access to works;

access to author of successful works and other information;

advertising and co-branding arrangements with publisher indicating books or other works that readers might like based on their reviews, areas of interest and other statistically determined data; and other revenue from fees derived from reader demographic information.

Other embodiments and uses of the invention will be apparent to those skilled in the art from consideration of the specification and practice of the invention disclosed herein. The specification and examples should be considered exemplary only. The scope of the invention is only limited by the claims appended hereto.

What is claimed is:

1. A system for providing reader-supplied evaluation of a sample of an authored literary work for potential publication of the work comprising:
   a host computer comprising a processor and a storage device;
   a first interface module operably connected to the Internet, for receiving only a portion of the literary work from an author to be reviewed via the Internet;
   the storage device stores portion of the literary work along with other portions of other literary works for review;
   a second interface module that receives a request from a reader to review the portion of the literary work;
   a work presenter that presents the portion of literary work to the reader based on the reader's request;
   a security mechanism that limits the ability of users to misappropriate credit for the portion of literary work when the literary work were to be resubmitted by another author including a timestamp associated with a time of first receipt of the portion of the literary work from the author for resolving disputes regarding original authorship;
   a review receiving module that receives evaluation of the portion of the literary work from the reader and placing the review in the storage device associated with portion of the literary work;
   a criteria determination module, executed by the processor, having multiple levels of review of the authored literary work, further comprising:
   a reader-satisfaction module, executed by the processor, for determining whether a predetermined reader-satisfaction criteria is met during a first level review, the first level review being one of multiple levels of review; and
   a demographic module for determining whether the literary work has been reviewed by a predetermined number of reviewers from a plurality of reviewer demographics; and
   a publishing determination module that decides to publish the literary work when the predetermined reader-satisfaction criteria is met and when the literary work has been reviewed by a predetermined number of reviewers from a plurality of reviewer demographics.

2. The system of claim 1 further comprising an analysis module that generates analysis information regarding the literary work based on reader-feedback.

3. The system of claim 2 further comprising an input receiver module that receives reader-feedback specifying whether a reader would purchase the literary work.

4. The system of claim 3 wherein the analysis indicates the percentage of readers that would purchase the literary work per the number of readers that provided reader-feedback specifying that the reader would purchase the literary work.

5. The system of claim 1 wherein the criteria determination module determines whether a predetermined number of reviews have been made during the first level review prior to evaluating whether the reader-satisfaction criteria have been met.

6. The system of claim 5 wherein the criteria determination module determines whether a predetermined number of reviews have been made for each round prior to evaluating whether the reader-satisfaction criteria have been met.

7. The system of claim 6 wherein the criteria determination module removes a literary work from availability for presentation to a reader when the literary work does not met the predetermined reader-satisfaction criteria.

8. The system of claim 6 wherein the reader-satisfaction criteria are different for each round.

9. The system of claim 8 wherein the reader-satisfaction criteria comprise a willingness to purchase and wherein the percentage of readers that find the work willing to purchase increases with each round.

10. The system of claim 1 wherein the criteria determination module has a second level review wherein the second level review only occurs when the system determines that a predetermined satisfaction level is met.

11. The system of claim 10 wherein a rejection notification is sent to the author when the second level review does not occur.

12. The system of claim 1 further comprising reader-feedback module that provides reader feedback to the author when the literary work is rejected to enable the author to revise the literary work for resubmission.

13. The system of claim 1 wherein the work presenter selects a portion of the literary work from the storage device based on demographics of the reader and the number of readers from each demographic that the literary work needs to meet the demographic reader requirements.

14. The system of claim 1 wherein the literary work presenter selects a work based on a genre selected by the reader.

15. The system of claim 1 further comprising a membership module that creates a membership for the author prior to literary work submission that includes a contract in which the member/submitter agrees to pay a percentage of royalties earned from the literary work when it is published.

16. The system of claim 15 wherein the membership module also collects a fee for each submission of a literary work for review from the member.

17. The system of claim 1 wherein the security mechanism comprises providing only a portion of the work to limit access of the reader to the entirety of the literary work.

18. A method for providing on-line evaluation of authored literary work for potential publication of the work comprising the steps of:
receiving a portion of a literary work from an author to be reviewed via an Internet communication from a remote computer system;
storing the portion of the literary work along with other portions of other literary works for review at a host computer system, said host computer comprising a processor for performing the steps of:
receiving a request from a reader to review the portion of the literary work;
presenting one of the portions of the literary work to the reader based on the reader's request electronically over a network;
implementing at least one security mechanism to limits the ability of users to misappropriate credit for the portion of literary work when the literary work were to be resubmitted by another author including a timestamp associated with a time of first receipt of the portion of literary work from the author for resolving disputes regarding original authorship;
receiving an evaluation of the portion of literary work from the reader and associated with the portion of the literary work;
determining whether the portion of literary work meets a predetermined reader-satisfaction criteria during a first level review, the first level review being one of multiple levels of review;
determining whether the literary work has been reviewed by a predetermined number of reviewers from a plurality of reviewer demographics; and
deciding to publish the literary work when the predetermined reader-satisfaction criteria is met and when the literary work has been reviewed by a predetermined number of reviewers from a plurality of reviewer demographics.

19. The method of claim 18 further comprising the step of generating analysis information regarding the literary work based on the reader-feedback.

20. The method of claim 19 further comprising the step of receiving reader-feedback at an input receiver module, the reader-feedback specifying whether a reader would purchase the literary work.

21. The method of claim 20 wherein the analysis indicates the percentage of readers that would purchase the work per the number of readers that provided reader-feedback specifying that the reader would purchase the literary work.

22. The method of claim 18 wherein the first level review comprises determining whether a predetermined number of reviews have been made during the first level review prior to evaluating whether the reader-satisfaction criteria have been met.

23. The method of claim 22 wherein the first level review comprises multiple rounds of criteria determination wherein each round has a predetermined number of reviewers and a reader-satisfaction criteria.

24. The method of claim 23 further comprising the step of removing a literary work from availability for presentation to a reader when the literary work does not meet the predetermined reader-satisfaction criteria.

25. The method of claim 24 further comprising the step of providing feedback to the reader when a literary work is rejected to enable the reader to revise the literary work for resubmission.

26. The method of claim 23 wherein the reader-satisfaction criteria are different for each round.

27. The method of claim 26 wherein the reader-satisfaction criteria comprise a willingness to purchase and wherein the percentage of readers that are willing to purchase the literary work increases with each round.

28. The method of claim 18 wherein the criteria determination step comprises a second level review wherein the second level review only occurs when the predetermined satisfaction level is met during the first level review.

29. The method of claim 28 further comprising the step of sending a rejection notification to the author when the second level review does not occur.

30. The method of claim 18 further comprising the step of selecting a literary work to present to a reader based on demographics of the reader and the number of readers from each demographic that the literary work needs to meet the demographic reader requirements.

31. The method of claim 18 wherein the work presentation step involves selecting a literary work based on a genre selected by the reader.

32. The method of claim 18 further comprising the step of creating a membership for the author prior to literary work submission that includes a contract in which the member/submitter agrees to pay a percentage of royalties earned from the literary work when it is published.

33. The method of claim 32 further comprising the step of collecting a fee for each submission of a literary work for review from the member.

34. The method of claim 18 further comprising the step of assisting in publication of the literary work when predetermined reader-satisfaction criteria are established.

35. The method of claim 34 further comprising the step of issuing a certification of approval from a host entity.

36. The method of claim 35 further comprising the step of licensing the publisher with the right to post the certification with the literary work.

37. The method of claim 35 further comprising the step of licensing the author with the right to post the certification with the literary work.

38. The method of claim 18 further comprising the step of providing on-line publication of an entire literary work that meets the predetermined reader-satisfaction criteria.

39. The method of claim 38 further comprising deriving revenue form the publication of the literary work.

* * * * *